United States Patent
Jou et al.

(10) Patent No.: US 9,239,819 B2
(45) Date of Patent: Jan. 19, 2016

(54) SYSTEM AND METHOD OF REPORT RENDERING

(75) Inventors: Stephan Jou, Kanata (CA); Doug Liversidge, Kanata (CA)

(73) Assignee: International Business Machines Corporation, Armonk, NY (US)

(*) Notice: Subject to any disclaimer, the term of this patent is extended or adjusted under 35 U.S.C. 154(b) by 1308 days.

(21) Appl. No.: 11/856,423

(22) Filed: Sep. 17, 2007

(65) Prior Publication Data

US 2008/0198156 A1    Aug. 21, 2008

(30) Foreign Application Priority Data

Feb. 19, 2007    (CA) ..................................... 2578980

(51) Int. Cl.
| | |
|---|---|
| G06T 11/20 | (2006.01) |
| G06T 11/80 | (2006.01) |
| G06F 17/21 | (2006.01) |
| G06F 17/24 | (2006.01) |
| G06F 17/30 | (2006.01) |
| G06Q 10/10 | (2012.01) |

(52) U.S. Cl.
CPC ............ *G06F 17/212* (2013.01); *G06F 17/245* (2013.01); *G06F 17/30905* (2013.01); *G06Q 10/10* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 4,724,521 A | 2/1988 | Carron et al. | |
| 5,287,490 A | 2/1994 | Sites | |
| 5,414,809 A * | 5/1995 | Hogan et al. .................. 715/765 |
| 5,448,740 A | 9/1995 | Kiri et al. | |
| 5,586,330 A | 12/1996 | Knudsen et al. | |
| 6,049,821 A | 4/2000 | Theriault et al. | |
| 6,282,698 B1 | 8/2001 | Baker et al. | |
| 6,317,873 B1 | 11/2001 | Townsend | |
| 6,725,426 B1 | 4/2004 | Pavlov | |
| 6,728,950 B2 | 4/2004 | Davis et al. | |
| 7,320,122 B2 | 1/2008 | Chawla et al. | |
| 7,356,809 B1 | 4/2008 | Sturges | |
| 7,403,940 B2 | 7/2008 | Narsude | |
| 7,461,370 B2 | 12/2008 | Wyschogrod et al. | |
| 7,539,973 B2 | 5/2009 | Hodge | |
| 8,656,371 B2 | 2/2014 | Jou | |

(Continued)

FOREIGN PATENT DOCUMENTS

| | | |
|---|---|---|
| EP | 0 602 263 A1 | 6/1994 |
| EP | 1603052 A1 | 12/2005 |

(Continued)

OTHER PUBLICATIONS

WAP WML. Wireless Application Protocol Wireless Markup Language Specification—Version Apr. 30, 1998 (59 pages).

(Continued)

*Primary Examiner* — Tize Ma
(74) *Attorney, Agent, or Firm* — Shumaker & Sieffert, P.A.

(57) ABSTRACT

A report rendering system and method of filtering and navigating reports on mobile devices are provided. The report rendering system comprises a scene generator for generating a scene of a report in response to a request to view the report or a subset of the report and a navigation module for storing selected components within the scene. The method comprises the steps of generating a scene of a report in response to a request to view the report or a subset of the report and storing selected components within the scene.

18 Claims, 10 Drawing Sheets

(56) References Cited

U.S. PATENT DOCUMENTS

| | | | |
|---|---|---|---|
| 2002/0147847 A1 | 10/2002 | Brewster et al. | |
| 2003/0163441 A1 | 8/2003 | Godfredsen et al. | |
| 2004/0154004 A1 | 8/2004 | Maine | |
| 2004/0166834 A1 | 8/2004 | Omar et al. | |
| 2004/0187099 A1 | 9/2004 | Irwin et al. | |
| 2004/0199665 A1 | 10/2004 | Omar et al. | |
| 2005/0060300 A1* | 3/2005 | Stolte et al. | 707/3 |
| 2005/0273773 A1 | 12/2005 | Gold et al. | |
| 2006/0015857 A1 | 1/2006 | Gold et al. | |
| 2006/0031187 A1* | 2/2006 | Pyrce et al. | 707/1 |
| 2006/0048107 A1 | 3/2006 | Thiagarajan et al. | |
| 2006/0155700 A1 | 7/2006 | Dejean et al. | |
| 2006/0200761 A1 | 9/2006 | Judd et al. | |
| 2007/0006097 A1 | 1/2007 | Makela | |
| 2007/0192739 A1* | 8/2007 | Hunleth et al. | 715/823 |
| 2010/0251224 A1 | 9/2010 | Cheriton | |

FOREIGN PATENT DOCUMENTS

| | | | |
|---|---|---|---|
| WO | WO 98/33130 A1 | 7/1998 | |
| WO | WO 03/007184 A1 | 1/2003 | |
| WO | 2005029308 A2 | 3/2005 | |

OTHER PUBLICATIONS

Canadian Office Action from Application Serial No. 2,602,749 dated Mar. 2, 2011 (2 pages).

Office Action from related U.S. Appl. No. 11/855,653 dated Mar. 3, 2011 (22 pages).

Response to Office Action from related U.S. Appl. No. 11/855,653, filed May 31, 2011 (13 pages).

European Communication from Application Serial No. 08 002 969.7-1527 dated Feb. 9, 2011 (8 pages).

Ashraf et al., "ClusTex: Information Extraction from HTML pages," 21st International Conference on Advanced Information Networking and Applications Workshops (AINAW'07), vol. 1, May 21-23, 2007, 6 pp.

Ashraf et al., "Employing Clustering Techniques for Automatic Information Extraction From HTML Documents," IEEE Transactions on Systems, Man, and Cybernetics—Part C: Applications and Reviews, vol. 38, No. 5, Sep. 2008, 14 pp.

Click et al., "A Simple Graph-Based Intermediate Representation," 1995 ACM SIGPLAN Workshop on Intermediate Representations, IR '95, vol. 30, No. 3, Mar. 1993, 15 pp.

D'Hondt, "Hybrid Aspects for Integrating Rule-Based Knowledge and Object-Oriented Functionality," Vrije Universiteit Brussel, System and Software Engineering Lab, PhD Thesis, May 2004, 209 pp.

Ouahid et al., "Converting Web Pages into Well-formed XML Documents," 1999 IEEE International Conference on Communications, ICC '99, vol. 1, Jun. 6-10, 1999, 5 pp.

"IA-32 Intel Architecture Software Developer's Manual, vol. 2: Instruction Set Reference," Intel Corporation, 2002, 963 pp. (Applicant points out that, in accordance with MPEP 609.04(a), the 2002 year of publication is sufficiently earlier than the effective U.S. filing date and any foreign priority date of Sep. 17, 2007, so that the particular month of publication is not in issue.).

Bourret et al., "A Generic Load/Extract Utility for Data Transfer Between XML Documents and Relational Databases," Second International Workshop on Advanced Issues of E-Commerce and Web-Based Information Systems, WECWIS, Jun. 8-9, 2000, 10 pp.

Burke, "Scanning HTML," The Perl Journal, Issue 19, 2000, 11 pp. (Applicant points out that, in accordance with MPEP 609.04(a), the 2000 year of publication is sufficiently earlier than the effective U.S. filing date and any foreign priority date of Sep. 17, 2007, so that the particular month of publication is not in issue.).

Yamaguchi et al., "Generalized Vulnerability Extrapolation using Abstract Syntax Trees," Proceedings of the 28th Annual Computer Security Applications Conference, ACSAC, Dec. 3-7, 2012, 10 pp.

Prosecution History from U.S. Pat. No. 8,656,371, dated Jan. 28, 2008 through Oct. 21, 2013, 206 pp.

European Search Report from counterpart European Application No. 08002970.5, dated Sep. 26, 2008, 7 pp.

* cited by examiner

| Division | Level 7 | Rep In | Forecast | Up |
|---|---|---|---|---|
| Row Focus | ect Sales | $1,587 | $682 | $2 |
| Column Focus | ect Sales | $1,150 | $352 | $2 |
| Mark Cell | | | | |
| Zoom In | ect Sales | $1,011 | $732 | $1,8 |
| Zoom Out | | | | |
| Zoom... | | $3,748 | $1,766 | $6 |
| Email Report | | | | |
| Find in Page | | | | |
| Search... | | | | |
| Details | | | | |

Figure 11B

| | |
|---|---|
| Division | Central Europe |
| Level 7 | Direct Sales |
| Rep In | $1,587 |
| Forecast | $682 |
| Upside | $2,197 |

Row Focus (Row 2 of 5)

SYSTEM AND METHOD OF REPORT RENDERING

FIELD OF THE INVENTION

The invention relates generally to report generation and in particular to a report rendering system and method of displaying and navigating reports on mobile devices.

BACKGROUND OF THE INVENTION

Mobile devices, including but not limited to cell phones, smart phones, and PDAs, are often constrained in screen space, input methods, and memory. For example, screen space is often much smaller on a mobile display than on a personal computer (PC) display, such that traditional reports do not fit on a mobile display. Many mobile devices, especially cell phones, do not have touch screens or full navigation controls, such as a mouse. Instead, such mobile devices typically have track wheels or directional pads which are limited to two or four directions of movement. Memory capabilities are generally limited on mobile devices. As a result, displaying and interacting with large, complex reports can be challenging.

In order to display reports on mobile devices, most mobile reporting applications require that the original report be simplified. This means that a complex report that may, for example, contain many components or large tables and crosstabs need to first be re-authored into one or more "mobile-friendly" versions of the original report. These re-authored reports would have simplified layouts or reduced table or crosstab columns, so that they display and load properly on the constrained device. However, this produces a new set of reports that would required additional maintenance (by authors) and learning (by consumers).

Other solutions rely on a translation process, translating the normal output generated by a web-based reporting solution into simplified HTML that can be displayed on the mobile browser. Since mobile browsers are less capable than PC based browsers, attempting to display the raw HTML from reporting solutions will either fail outright or produce a visual result that bears little resemblance to the original report. Translation software removes certain features (such as CSS, complex table structures, and JavaScript) and simplifies the HTML (such as by paginating the page into smaller mobile pages) to end up with smaller, simpler HTML that can be handled by the mobile device.

Even if an entire report was capable of being rendered on a mobile device, the display screen is so small that users have difficulty seeing and navigating the information due to reports larger than the screen can display, or resolution issues due to shrinking the reports to fit on the screen.

Some solutions use elements of both simplification and translation. For example, the Sybase Unwired Accelerator platform allows users to re-author reports in an authoring environment, and then generates simplified HTML that is then displayed within mobile browsers.

SUMMARY OF THE INVENTION

In accordance with an embodiment of the present invention, there is provided a report rendering system for filtering and navigating reports. The report rendering system comprises a scene generator for generating a scene of a report in response to a request to view the report or a subset of the report and a navigation module for storing selected components within the scene.

In accordance with another embodiment of the present invention, there is provided a method of filtering and navigating reports. The method comprises the steps of generating a scene of a report in response to a request to view the report or a subset of the report and storing selected components within the scene.

In accordance with another embodiment of the present invention, there is provided a memory containing computer executable instructions that can be read and executed by a computer for caring out a method of filtering and navigating reports. The method comprises the steps of generating a scene of a report in response to a request to view the report or a subset of the report and storing selected components within the scene.

In accordance with another embodiment of the present invention, there is provided a carrier carrying a propagated signal containing computer executable instructions that can be read and executed by a computer, the computer executable instructions being used to execute a method of filtering and navigating reports. The method comprises the steps of generating a scene of a report in response to a request to view the report or a subset of the report and storing selected components within the scene.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENTS

A system and method of the present invention will now be described with reference to various examples of how the embodiments can best be made and used. For convenience, like reference numerals are used throughout the description and several views of the drawings to indicate like or corresponding parts, wherein the various elements are not necessarily drawn to scale.

Figure 1:
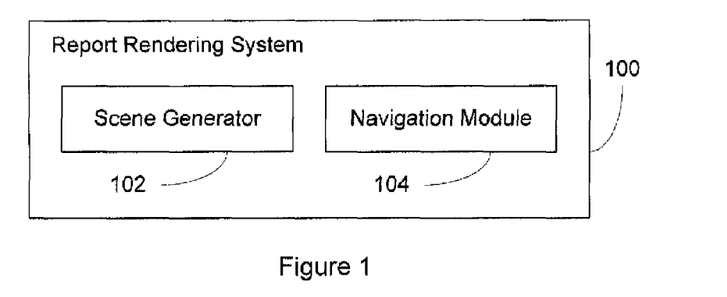
FIG. 1 shows in a diagram an example of a report rendering system for filtering and navigating reports or subsets of reports on mobile devices, in accordance with an embodiment of then present invention.

FIG. 1 shows in a diagram an example of a report rendering system 100 for filtering and navigating reports or subsets of reports, in accordance with an embodiment of the present invention. The report rendering system 100 comprises a scene generator 102 for generating a scene of a report in response to a request to view the report or a subset of the report, and a navigation module 104 for storing selected components within the scene. A scene generated by the scene generator 102 may include a view of the entire report, a subset of the report, a transformation of the report or a transformation of a subset of the report. The report rendering system 100 may be implemented as code running on a mobile device, or any computer system including a display and input functionality that could benefit from such system 100.

Figure 2:
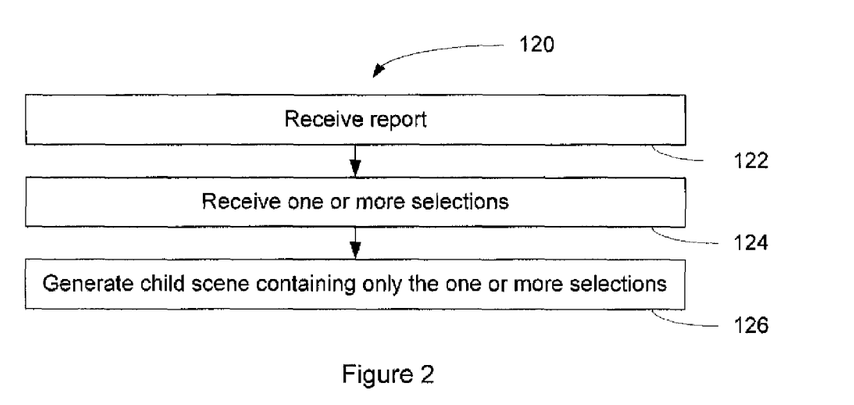
FIG. 2 shows in a flowchart an example of a method of filtering and navigating reports or subsets of reports on mobile devices, in accordance with an embodiment of the report rendering system.

FIG. 2 shows in a flowchart an example of a method of filtering and navigating reports or subsets of reports on mobile devices (120), in accordance with an embodiment of the report rendering system 100. The method (120) begins with the report rendering system 100 receiving a version of a report (122), labelled as the parent scene of the report. Using the navigation module, a user navigates the parent scene and may select one or more components or objects in the original scene, such as tables (including lists and crosstabs), charts, columns, rows, cells, etc., found in the report (or parent scene). Any selection made by the user is passed by the navigation module to the scene generator. Upon receipt of the one or more selections (124), the scene generator generates a child scene containing only the selected objects or components (126). Other steps may be added to the method (120), including performing operations on an intermediate version of the child scene.

Figure 3:
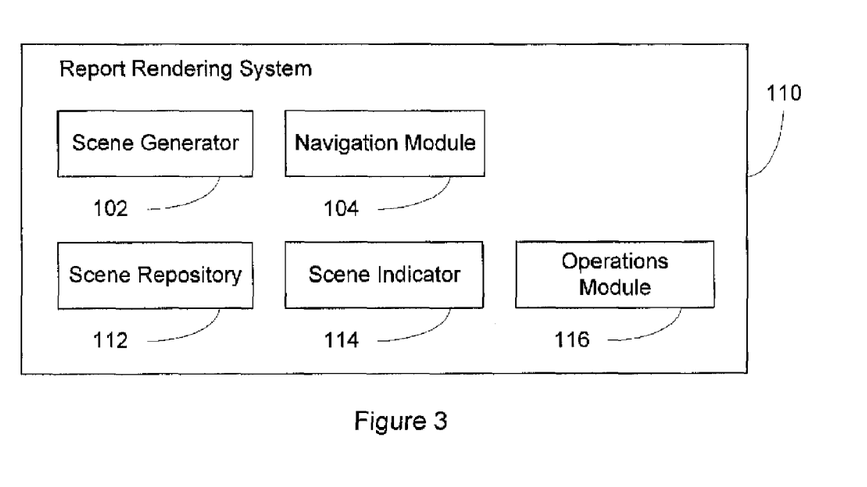
FIG. 3 shows another example of a report rendering system, in accordance with an embodiment of the present invention.

FIG. 3 shows in a diagram another example of a report rendering system 110, in accordance with an embodiment of the present invention. The report rendering system 110 includes the scene generator 102, the navigation module 104, a scene repository 112 for storing scenes of reports, a selection indicator 114 for selecting objects within a scene, and an operations module 116 for storing and executing operations and transformations on one or more selected objects. The scene repository 112 may be implemented as a stack or as an array of scenes. The selection indicator 114 may be implemented as code that highlights objects in the scene. The operations module 116 may be implemented as a series of functions or classes that can be invoked by the scene generator 102 based on a chosen transformation. Operations in the operations module 116 may include a focus operation for generating a new scene that only contains the selected objects in the previous scene, an escape operation for returning to a previous scene, and a transformation for modifying a generated scene. Transformations include a column transformation for generating a new scene that only contains the selected column and any table headers in the currently selected table from the previous scene, a row transformation for modifying the generating new scene so that it also includes the table headers for the selected row and optionally renders the new scene with all rows presented as columns, a chart transformation for generating a new scene that focuses only on a selected chart and creates new navigation areas corresponding to the elements inside the object, and a null transformation for operations where only focus operations are required. In this document, a table refers to either a list or a crosstab. Other types of tables may be implemented.

Navigating the report is accomplished by the user navigating through a collection of scenes (i.e., scene repository 112), where each scene in the collections comprises a visual representation of a page in the report, or a subset of that page. A selection indicator 114 allows objects within any scene to be selected. For example, if the collection of scenes or scene repository 112 is implemented as a stack, users can then "push" a new scene unto the stack by performing a focus operation, and optionally a transformation, on the currently selected object in the scene, or "pop" up to the previous, parent scene. A focus operation is defined as taking the currently selected object, and creating a new child scene that contains the selected object (or a transformed version of the selected object), allowing the user to view a subset of the previous parent scene. The user can now select objects within this child scene, and perform further focus operations to subset this child scene into further child scenes (where the first child scene is a parent scene of a subsequent child scene), or escape operations to return to a parent scene by popping the current child scene.

On a typical mobile device, selection may be implemented using the available hardware track wheel, 4-way navigator device, or a touch screen, while focus and escape operations may be implemented using the available hardware buttons on the device. Advantageously, this allows convenient and rapid navigation throughout the report scenes.

As part of the focus operation, the selected object can be optionally transformed so that instead of creating a new child scene that contains an unmodified version of the selected object, a transformed version of the selected object is created with optional components from the parent scene. Such transformations (some described further below) allows for the generation of child scenes that are even further optimized for constrained devices.

Figure 4:
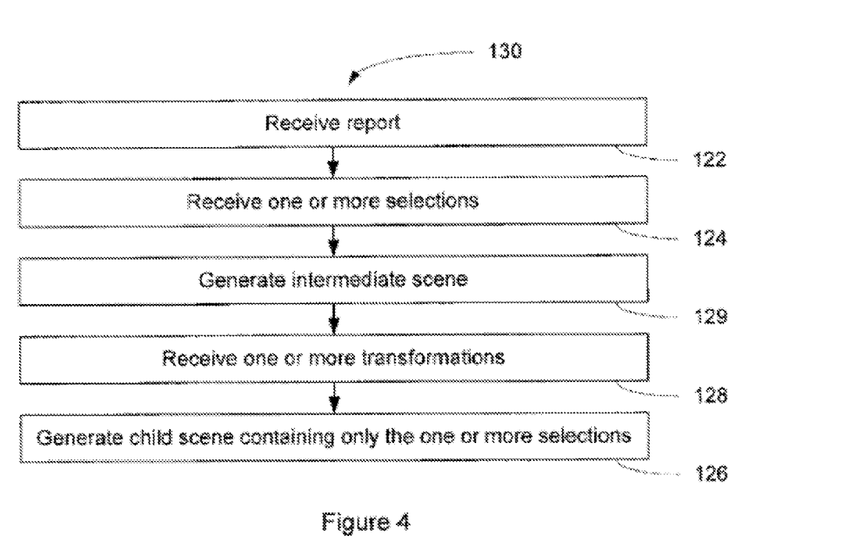
FIG. 4 shows in a flowchart another example of a method of filtering and navigating reports or subsets of reports on mobile devices, in accordance with an embodiment of the report rendering system.

FIG. 4 shows in a flowchart another example of a method of filtering and navigating reports or subsets of reports on mobile devices (130), in accordance with an embodiment of the report rendering system 110. The method (130) begins with the report rendering system 110 receiving a version of a report (i.e., a parent scene) (122). Next, the report rendering system 110 receives a current selection from the navigation module (124) of user selected objects and components from the parent scene. Next, the scene generator 102 generates an intermediate scene (129) containing only the selected objects, labelled as an intermediate child scene. One or more transformations are performed by the operations module 116 on the intermediate child scene (128) which results in the new child scene (126). The one or more transformations performed by the operations module 116 (128) may include a null transformation. When only a null transformation is included in step 128, the method results in a focus operation on the report (or parent scene). Other operations may be performed as described below.

Figure 5:
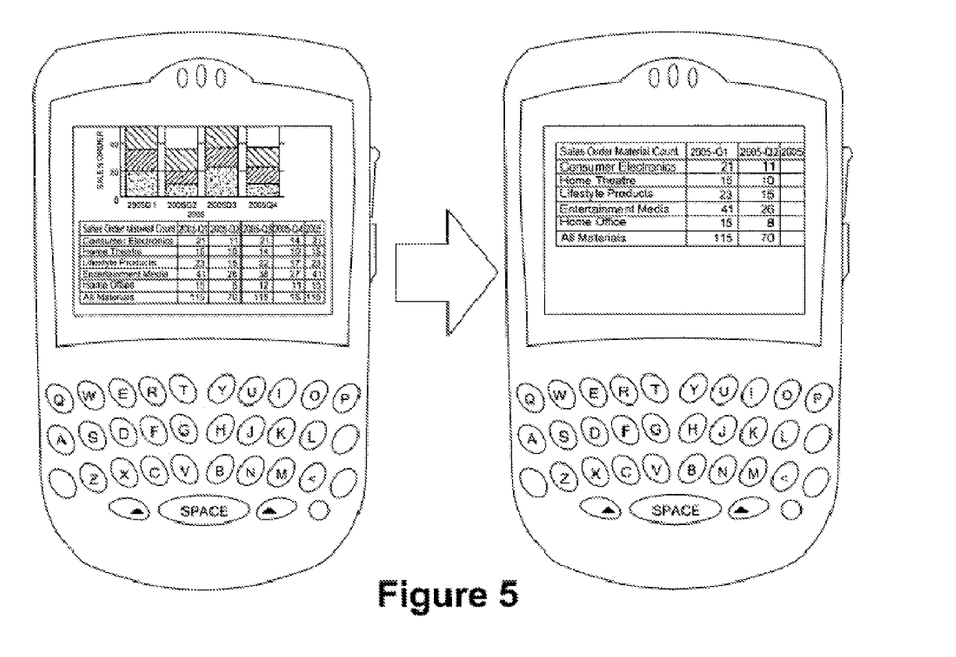
FIG. 5 shows in a screenshot an example of a focus operation transitioning from an overview page scene to a new child scene that contains only the table, in accordance with an embodiment of the report rendering system.

FIG. 5 shows in a screenshot an example of a focus operation transitioning from an overview page scene to a new child scene that contains only the table, in accordance with an embodiment of the report rendering system. In this example, the transformation used was the null transformation. This is only one example of an implementation of the report rendering system 100, 110.

Users typically start with a scene that represents a page in the report, so that they would see a visual representation of the entire page (preserving the structural layout of the original report). Because the page is potentially much larger than the available screen space, it is usually (but not necessarily) zoomed out to fit the available screen width. This page may show a large dashboard with multiple tables and charts. Despite having to zoom out, the page allows the report to be displayed in a manner that the user would be familiar with from larger displays. The user can then select an object of interest, such as a table, and perform a focus operation. A new child scene can now be pushed that shows only the table. The user can now identify a row of interest, and perform a focus operation on that row. A subsequent child scene is then generated that shows only that row. In this example, a row transformation, defined further below, is used to take advantage of the preference of vertical scrolling over horizontal scrolling on mobile devices.

Figure 6:
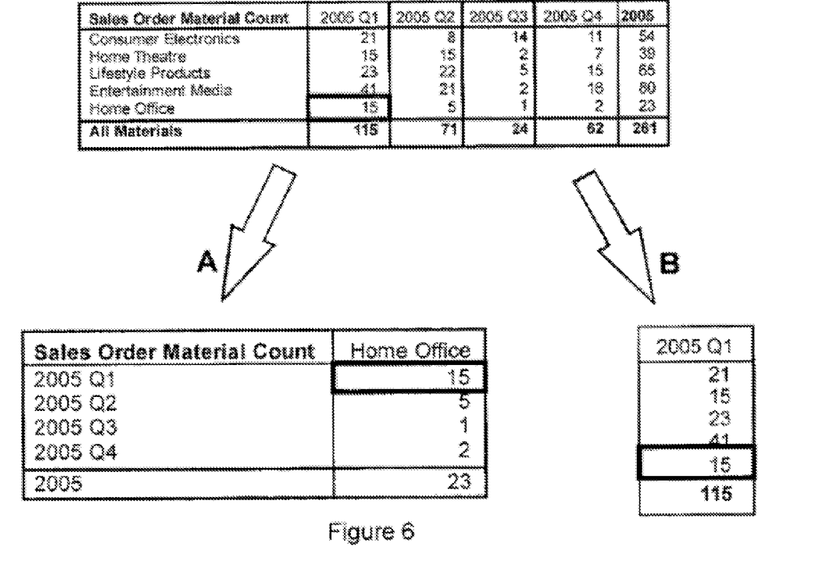
FIG. 6 shows in a screen shot an example of a row transformation and a column transformation, in accordance with an embodiment of the report rendering system.

FIG. 6 shows in a screen shot an example of a row transformation and a column transformation, in accordance with an embodiment of the report rendering system 100, 110. A focus operation can also transform the scene. In this example, a focused table undergoes a column transformation to narrow in on a single column (B), while a row transformation (A) transforms the actual table structure to display the entire row as if it was a column, to avoid horizontal scrolling on a small screen device. Other focus and transformation operations are possible, such as taking into account multiple selections, and other object types, such as charts and crosstabs.

When a focus operation on a selected scene object is performed, transformations may then be performed on the object in the new scene to make it more suitable for mobile devices. One nontrivial example of this is the row-column transformation.

Rows in tables (such as lists or crosstabs) are often much wider than can be displayed on a constrained screen. However, most mobile devices are optimized for vertical scrolling rather than horizontal scrolling. For example, most BlackBerry™ devices have a track wheel on the device's right side that rolls up and down.

A row transformation takes the selected row (or rows), and presents it instead as a column (or set of columns). This inversion results in a new pushed child scene that allows the user to navigate using vertical scrolling rather than horizontal scrolling.

When a focus operation is performed on a row or column within a table (such as a list or a crosstab), and that table contains header columns or header rows, a header transformation copies into the new scene the header columns or header rows for the table, rather than just the selected row, rows, column or columns. This results in a more meaningful child scene, as it automatically includes identifying context information (eg., header columns or header rows) into the child scene that would otherwise be lost.

There are other transformations that can be done during a focus operation beyond those mentioned in this document. Some of these transformations can be algorithmically determined, for example, based on knowledge of the currently selected object and its attributes, or selected from among a set of choices by the user through the user interface.

Figure 7A:
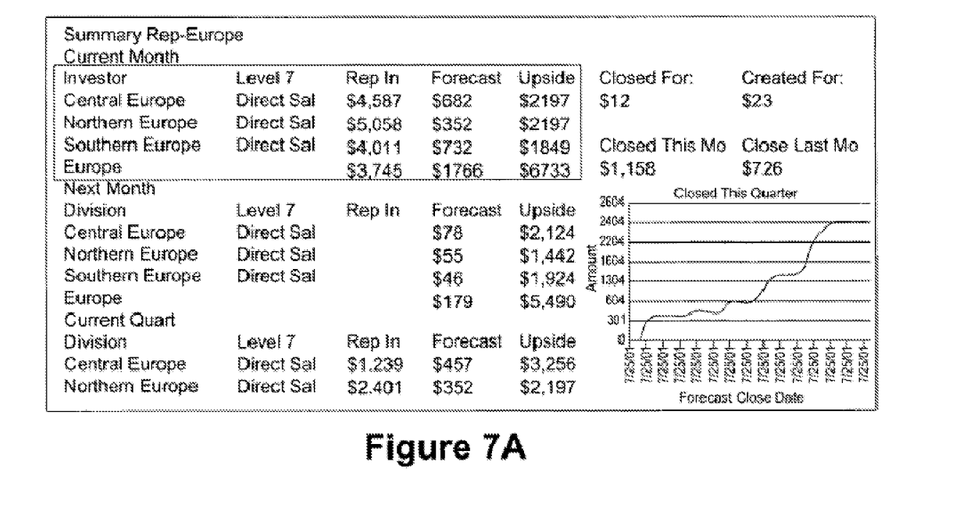
FIGS. 7A to 7C show in screenshots an example of a focus operation on a table, as implemented on a mobile device, in accordance with an embodiment of the report rendering system.
Figure 7B:
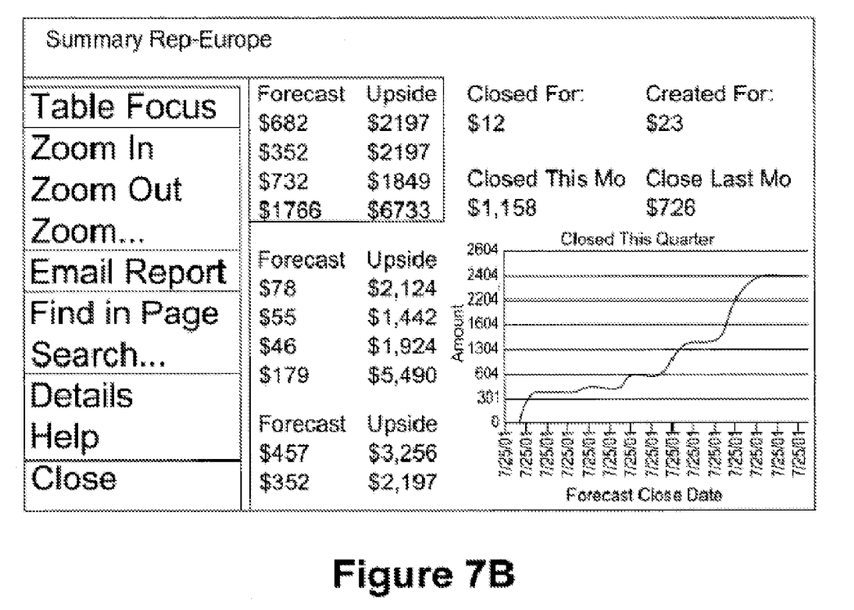
Figure 7C:
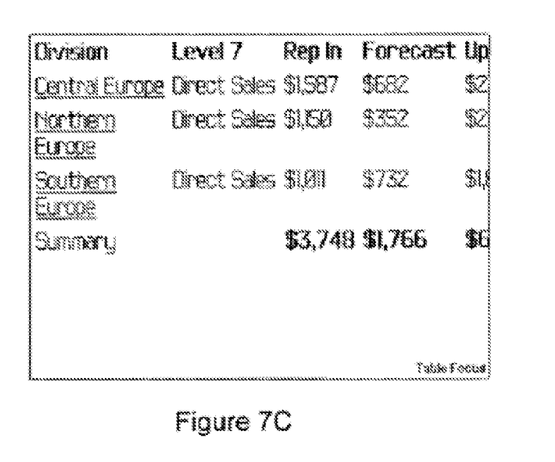

FIGS. 7A to 7C show in a series of screenshots an example of a focus operation on a table, as implemented on a BlackBerry™ device, in accordance with an embodiment of the report rendering system 100, 110. The focus operation and report rendering system 100, 110 may be implemented on other mobile devices.

FIG. 7A shows a report with a header, several tables, and a chart. The first table has been selected, as indicated by the selection rectangle.

FIG. 7B shows the user selecting the "Table Focus" operation from the BlackBerry menu.

FIG. 7C shows the resulting child scene after the table focus operation is complete. The new scene has been pushed unto the scene stack, and contains only the selected table and excludes the other items in the report.

Figure 8:
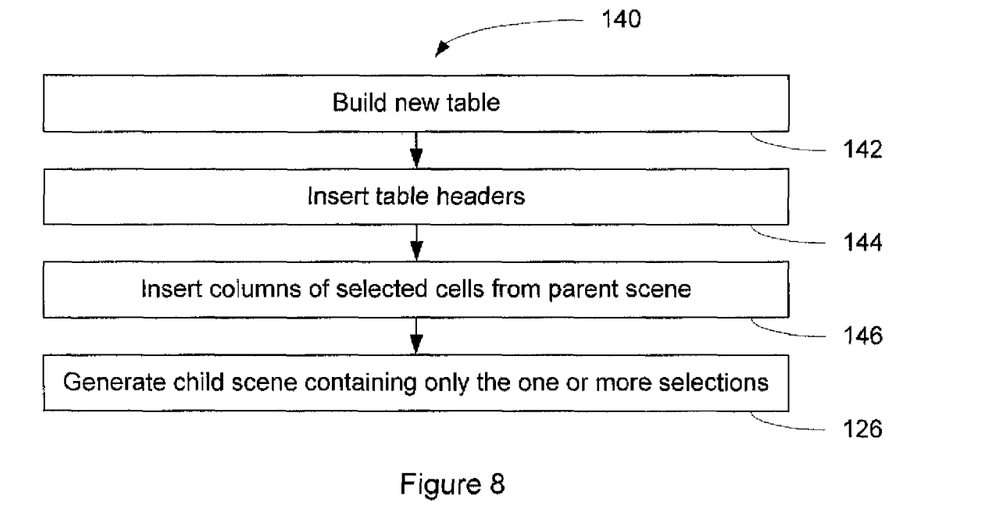
FIG. 8 shows in a flowchart an example of a method of performing a column transformation on a table of an intermediate scene, in accordance with an embodiment of the report rendering system.

FIG. 8 shows in a flowchart an example of a method of performing a column transformation on a table of an intermediate scene (140), in accordance with an embodiment of the report rendering system 110. The method (140) begins with building a new table (142). Next, table headers from the parent scene are inserted into the new table (144). Columns of selected cells from the parent scene are inserted into the table (146) resulting in the new child scene (126).

Figure 9A:
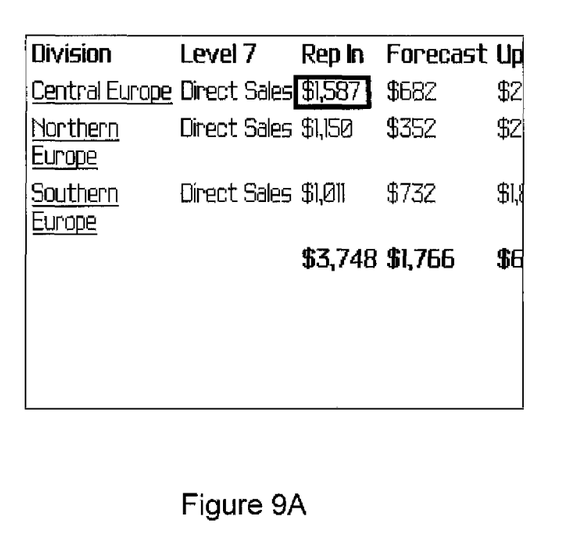
FIGS. 9A to 9C show in screenshots an example of a column transformation on a table, as implemented on a mobile device, in accordance with an embodiment of the report rendering system.
Figure 9B:
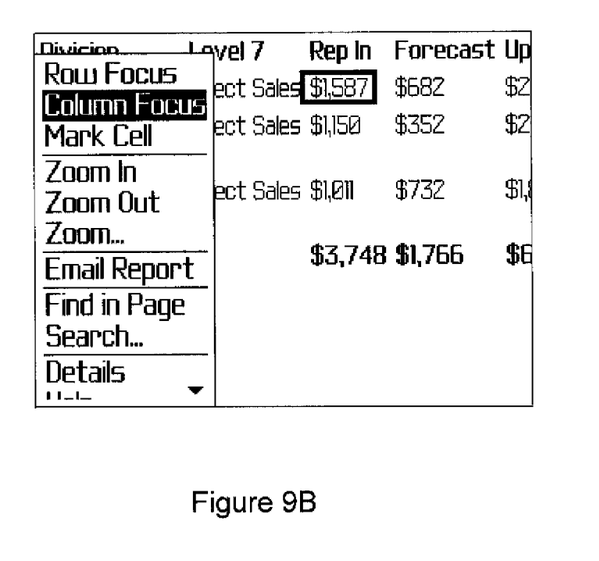
Figure 9C:
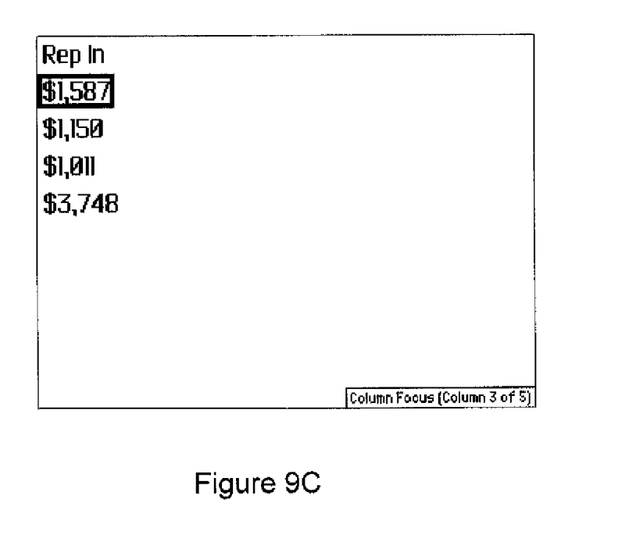

FIGS. 9A to 9C show in a series of screenshots an example of a column transformation on a table, as implemented on a BlackBerry device, in accordance with an embodiment of the report rendering system. The column transformation and report rendering system 100, 110 may be implemented on other mobile devices.

FIG. 9A shows a scene that contains only a table. The table contains several rows (Central Europe, Northern Europe, and Southern Europe) and several columns (Division, Level 7, Rep In, and Upside). Note that the table is wider than the current BlackBerry screen, so the last column is truncated. The "Rep In" column and the "Central Europe" row are currently selected, as indicated by the selection rectangle.

FIG. 9B shows the user selecting the "Column Focus" operation from the BlackBerry menu.

FIG. 9C shows the resulting child scene after the column focus operation is complete. A new scene has been pushed unto the scene stack, and contains only the selected "Rep In" column in the display and excludes the other columns in the parent table.

Figure 10:
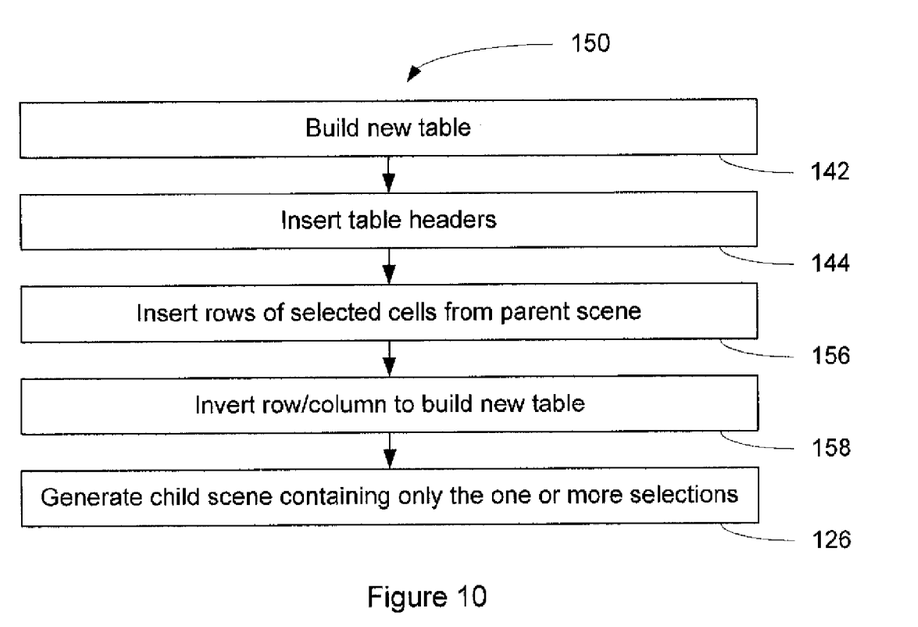
FIG. 10 shows in a flowchart an example of a method of performing a row transformation on a table of an intermediate scene, in accordance with an embodiment of the report rendering system.

FIG. 10 shows in a flowchart an example of a method of performing a row transformation on a table of an intermediate scene (150), in accordance with an embodiment of the report rendering system 110. The method (150) begins with building a new table (142). Next, table headers from the parent scene are inserted into the new table (144). Rows of selected cells from the parent scene are then inserted into the new table (156). Next, the rows and columns of the new table are inverted (158) resulting in the new child scene (126). Thus, the row transformation transforms a row from a parent scene into a column in the child scene.

Figure 11A:
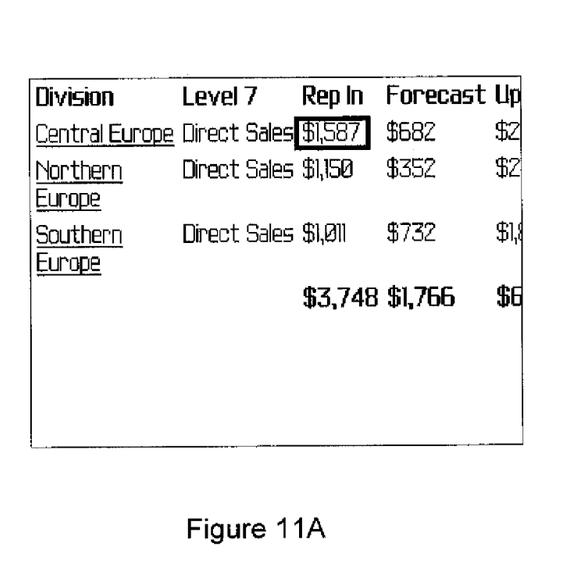
FIGS. 11A to 11C show in screenshots an example of a row transformation on a table, as implemented on a mobile device, in accordance with an embodiment of the report rendering system.
Figure 11B:
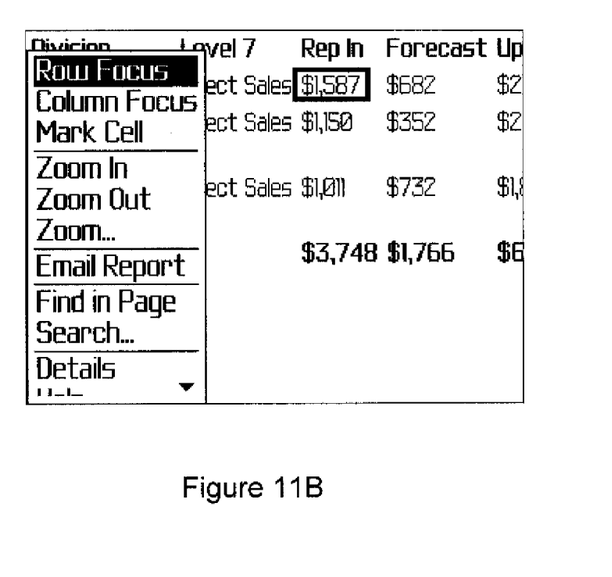
Figure 11C:
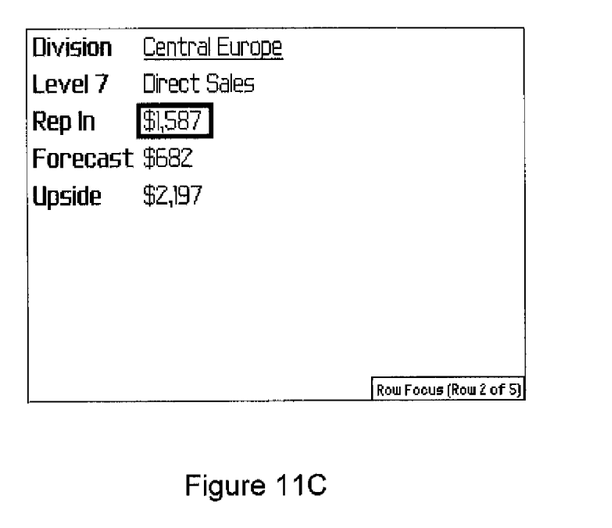

FIGS. 11A to 11C show in a series of screenshots an example of a row transformation on a table, as implemented on a BlackBerry device, in accordance with an embodiment of the report rendering system 110. The row transformation and report rendering system 110 may be implemented on other mobile devices.

FIG. 11A (identical to FIG. 9A) shows a scene that contains only a table. The table contains several rows (Central Europe, Northern Europe, and Southern Europe) and several columns (Division, Level 7, Rep In, and Upside). Note that the table is wider than the current BlackBerry screen, so the last column is truncated. The "Rep In" column and the "Central Europe" row are currently selected, as indicated by the selection rectangle.

FIG. 11B shows the user selecting the "Row Focus" operation from the BlackBerry menu.

FIG. 11C shows the resulting child scene after the row focus operation is complete. A new scene has been pushed unto the scene stack, and contains only the selected "Central Report" row in the display along with the header row from the parent table. In addition, the rows in the parent table have been transformed into columns, to produce a vertically-oriented display that is easier to view on BlackBerry screens.

In the case of cross-tabs, the report rendering system 110 preferably preserves cross-tab nesting.

Figure 12:
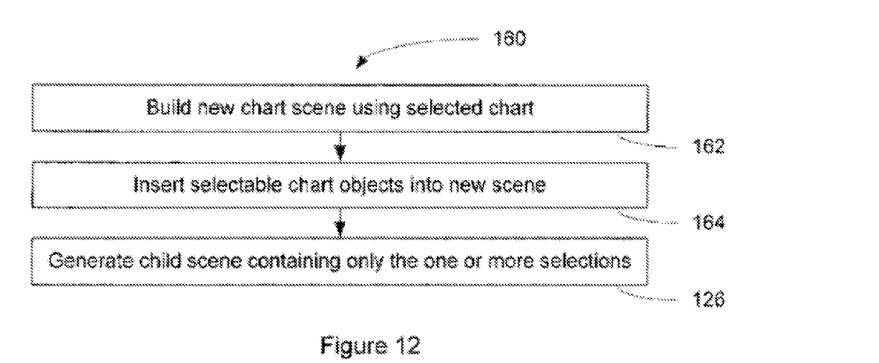
FIG. 12 shows in a flowchart an example of a method of performing a chart transformation on an intermediate scene, in accordance with an embodiment of the report rendering system.

FIG. 12 shows in a flowchart an example of a method of performing a chart transformation on an intermediate scene (160), in accordance with an embodiment of the report rendering system 110. The method (160) begins with building a new chart using the selected chart (162). Next selectable chart objects are inserted into the new chart (164) resulting in the new child scene (126). Selectable chart objects may include, for example, bars for bar charts, pies for pie charts, chart legends, chart labels, chart titles, points for scatter charts or line charts, etc.

Figure 13A:
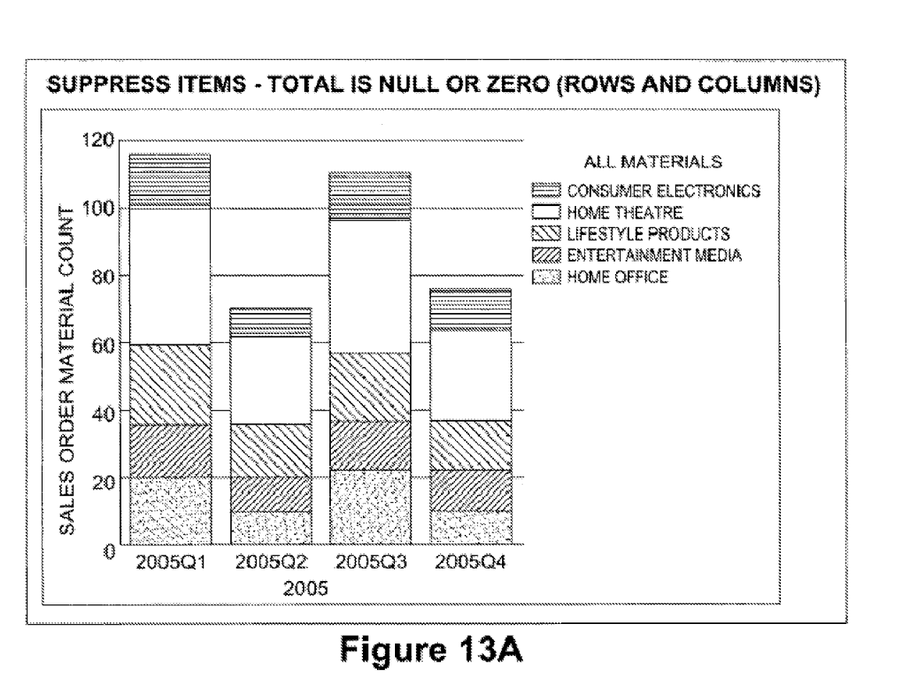
FIGS. 13A to 13C show in screenshots an example of a chart transformation, as implemented on a mobile device, in accordance with an embodiment of the report rendering system.
Figure 13B:
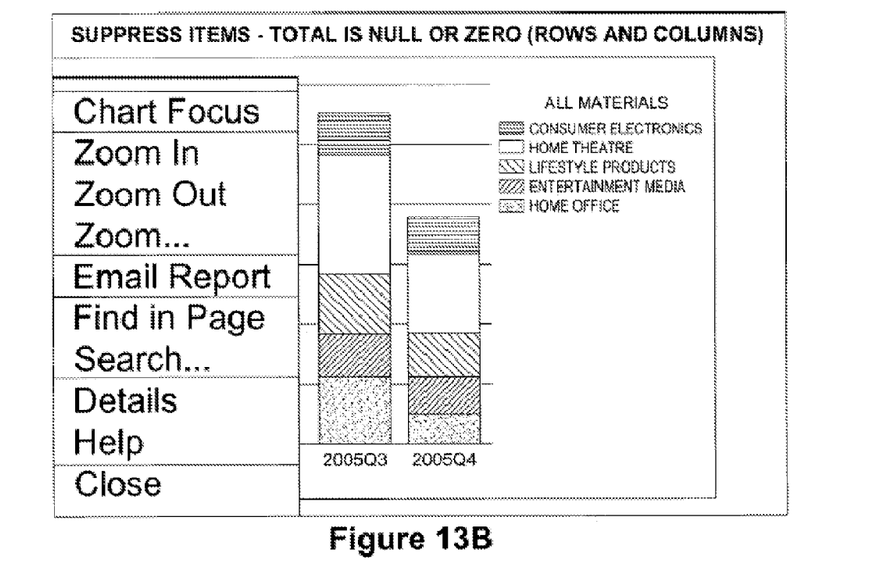
Figure 13C:
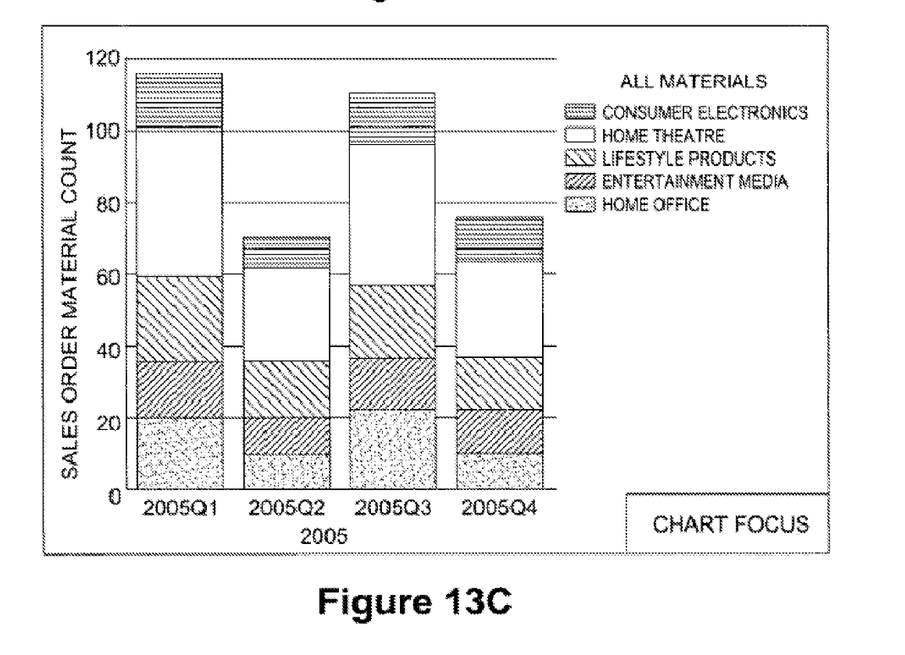

FIGS. 13A to 13C show in a series of screenshots an example of a chart transformation, as implemented on a BlackBerry device, in accordance with an embodiment of the report rendering system 110. The chart transformation and report rendering system 110 may be implemented on other mobile devices.

FIG. 13A shows a report that contains a title region ("Suppress Items—Total is Null or Zero (Rows and columns)" and a bar chart. The chart is currently selected, as indicated by the selection rectangle.

FIG. 13B shows the user selecting the "Chart Focus" operation from the BlackBerry menu.

FIG. 13C shows the resulting child scene after the chart focus operation is complete. A new scene has been pushed unto the stack, and contains only the selected chart at a larger size. In addition to the larger scene, the individual data items associated with each bar can now be associated with tooltips (not shown in this figure).

Advantageously, the stack-based navigation model allows users to go from arbitrarily complex scenes to simpler and simpler scenes through successive focus operations. Each focus operation may include transformations to generate child scenes that are easier to navigate, contain additional information, are more optimized for a mobile device screen, and other transformations.

Advantageously, the report rendering system 100, 110 allows a user to view the same report on a mobile device that he or she is familiar with on a PC, maintaining the same structural layout of the original report. Moreover, the user can effectively navigate and subset a potentially complex report. Further, the report authors can rely on a single version of a report to be consumed on any output device, rather than having to author and maintain multiple sets of reports (PC and mobile versions).

The systems and methods according to the present invention described above may be implemented by any hardware, software or a combination of hardware and software having the above described functions. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method comprising:
generating, by a computing device for display at a display device, a parent scene of a report, wherein the parent scene comprises one or more visual components, and wherein the parent scene is a visual representation of the report;
storing, by the computing device, the parent scene in a scene repository that stores a group of scenes, and wherein each scene in the group of scenes comprises a distinct visual representation of the report, wherein the scene repository that stores the group of scenes is a stack, and wherein storing the parent scene in the group of scenes of the scene repository comprises pushing the parent scene on the stack;
responsive to receiving a first user input that selects at least one visual component of the parent scene, generating, by the computing device and for display at the display device, a child scene that is a visual representation of a portion of the parent scene, the child scene including a subset of the one or more visual components of the parent scene, wherein the subset includes the at least one visual component of the parent scene;
storing, by the computing device, the child scene in the group of scenes of the scene repository, wherein the group of scenes includes at least the parent scene and the child scene, wherein storing the child scene in the group of scenes of the scene repository comprises pushing the child scene on the stack; and
responsive to receiving a second user input and while the child scene is output for display at the display device, selecting, by the computing device, the parent scene from the scene repository and outputting the parent scene at the display device to replace the child scene, wherein selecting the parent scene in response to receiving the second user input comprises popping the parent scene from the stack.

2. The method claim 1, wherein the child scene is a first child scene, the method further comprising:
responsive to receiving a second user input that selects at least one visual component of the first child scene, generating, by the computing device and for display at the display device, a second child scene that is a visual representation of a portion of the first child scene, the second child scene including a subset of the one or more visual components of the first child scene, wherein the subset includes the at least one visual component of the first child scene;
storing, by the computing device, the second child scene in the group of scenes of the scene repository, wherein the group of scenes includes at least the parent scene, the first child scene, and the second child scene; and
responsive to receiving a third user input and while the second child scene is output for display at the display device, selecting, by the computing device, the first child scene from the scene repository and outputting the first child scene at the display device to replace the second child scene.

3. The method of claim 1, further comprising:
receiving, by the computing device, a plurality of successive user inputs, wherein each respective user input of the plurality of successive user inputs selects a scene of the group of scenes of the scene repository; and
responsive to selecting each respective scene, outputting, by the computing device for display at the display device, the respective scene to replace a previously outputted scene included in the group of scenes of the scene repository.

4. The method of claim 1, wherein the child scene includes only the at least one visual component of the parent scene selected by the user input and excludes all other components of the one or more visual components.

5. The method of claim 1, wherein the at least one visual component comprises at least one of a table, a chart, a column, an image, a row, or a cell.

6. The method of claim 1, wherein the at least one visual component in the child scene is an unmodified version of the at least one visual component in the parent scene.

7. The method of claim 1, wherein generating the child scene that is the visual representation of the portion of the parent scene further comprises:
responsive to receiving the first user input that selects the at least one visual component of the parent scene, transforming, by the computing device, an appearance of the at least one visual component.

8. The method of claim 7, wherein transforming the appearance of the at least one visual component comprises:
transforming, by the computing device, the appearance of the at least one visual component to eliminate scrolling of the at least one visual component when output for display.

9. The method of claim 7, wherein transforming, by the computing device, an appearance of the at least one visual component comprises:
modifying, by the computing device, the appearance of the at least one visual component to invert a scrolling direction of data in the at least one visual component when output for display.

10. The method of claim 7, wherein the transforming of the appearance of the visual component is based at least in part on at least one of an attribute of the at least one visual component or a choice provided by a user interface.

11. The method of claim 7, wherein transforming, by the computing device, an appearance of the at least one visual component comprises:
determining, by the computing device, a size constraint of the display device; and
modifying, by the computing device, the appearance of the at least one visual component based at least in part on the size constraint of the display device.

12. The method of claim 7, wherein transforming, by the computing device, an appearance of the at least one visual component comprises:
determining, by the computing device, an optional component of the parent scene; and
modifying, by the computing device, the appearance of the at least one visual component based at least in part on the optional component of the parent scene.

13. The method of claim 1, further comprising:
labeling, by the computing device, the parent scene as a parent scene; and
labeling, by the computing device, the child scene as an intermediate child scene.

14. The method of claim 1, wherein the child scene that is the visual representation of the portion of the parent scene maintains the same structural layout as the report.

15. The method of claim 1, wherein each scene of the group of scenes is a portion of a single version of the report.

16. The method of claim 1, wherein receiving the first user input that selects the at least one visual component of the parent scene further comprises:
determining, by the computing device and based on a location of the first user input, the at least one visual component; and
highlighting, by computing device and for display at the display device, the at least one visual component.

17. A non-transitory computer readable memory containing computer instructions that, when executed by at least one processor, cause the at least one processor to:
generate, for display at a display device, a parent scene of a report, wherein the parent scene comprises one or more visual components, wherein the parent scene is a visual representation of the report;
store the parent scene in a scene repository that stores a group of scenes, and wherein each scene in the group of scenes comprises a distinct visual representation of the report, wherein the scene repository that stores the group of scenes is a stack, and wherein the parent scene is pushed on the stack to store the parent scene in the scene repository;
responsive to receiving a first user input that selects at least one visual component of the parent scene, generate, for display at the display device, a child scene that is a visual representation of a portion of the parent scene, the child scene including a subset of the one or more components of the parent scene, wherein the subset includes the at least one component of the parent scene;
store the child scene in the group of scenes of the scene repository, wherein the group of scenes includes at least the parent scene and the child scene, wherein the child scene is pushed on the stack to store the child scene in the scene repository; and
responsive to receiving a second user input and while the child scene is output for display at the display device, select the parent scene from the scene repository and outputting the parent scene at the display device to replace the child scene, wherein the parent scene is popped from the stack when selected in response to receiving the second user input.

18. A computer device comprising:
at least one processor; and
at least one module executable by the at least one processor to:
generate, for display at a display device, a parent scene of a report, wherein the parent scene comprises one or more visual components, wherein the parent scene is a visual representation of the report;
store the parent scene in a scene repository that stores a group of scenes, and wherein each scene in the group of scenes comprises a distinct visual representation of the report, wherein the scene repository that stores the group of scenes is a stack, wherein the parent scene is pushed on the stack to store the parent scene in the scene repository;
responsive to receiving a first user input that selects at least one visual component of the parent scene, generate, for display at the display device, a child scene that is a visual representation of a portion of the parent scene, the child scene including a subset of the one or more components of the parent scene, wherein the subset includes the at least one component of the parent scene;

store the child scene in the group of scenes of the scene repository, wherein the group of scenes includes at least the parent scene and the child scene, wherein the child scene is pushed on the stack to store the child scene in the scene repository; and responsive to receiving a second user input and while the child scene is output for display at the display device, select the parent scene from the scene repository and outputting the parent scene at the display device to replace the child scene, wherein the parent scene is popped from the stack when selected in response to receiving the second user input.

* * * * *